(12) United States Patent
Dupay et al.

(10) Patent No.: US 7,152,869 B2
(45) Date of Patent: Dec. 26, 2006

(54) FIFTH WHEEL HITCH REQUIRING REDUCED OR NO LUBRICANT

(75) Inventors: Steven C. Dupay, Holland, MI (US); Randy L. Schutt, Holland, MI (US)

(73) Assignee: The Holland Group, Inc., Holland, MI (US)

( * ) Notice: Subject to any disclaimer, the term of this patent is extended or adjusted under 35 U.S.C. 154(b) by 0 days.

(21) Appl. No.: 10/504,455

(22) PCT Filed: Feb. 7, 2003

(86) PCT No.: PCT/US03/03693

§ 371 (c)(1), (2), (4) Date: Aug. 11, 2004

(87) PCT Pub. No.: WO03/068539

PCT Pub. Date: Aug. 21, 2003

(65) Prior Publication Data

US 2005/0161902 A1    Jul. 28, 2005

Related U.S. Application Data

(60) Provisional application No. 60/355,908, filed on Feb. 11, 2002.

(51) Int. Cl.
*B62D 53/00*   (2006.01)
*B62D 53/06*   (2006.01)

(52) U.S. Cl. .................. 280/433; 280/434; 280/435; 280/436

(58) Field of Classification Search ............... 180/431, 180/433–436
See application file for complete search history.

(56) References Cited

U.S. PATENT DOCUMENTS

| | | | | |
|---|---|---|---|---|
| 4,042,006 A | * | 8/1977 | Engl et al. ..................... 164/46 |
| 5,851,675 A | * | 12/1998 | Oyagi et al. ................. 428/426 |
| 5,985,056 A | * | 11/1999 | McCay et al. ............... 148/511 |
| 6,220,617 B1 | * | 4/2001 | Hunger ........................ 280/433 |

FOREIGN PATENT DOCUMENTS

| | | |
|---|---|---|
| DE | 43 04 857 | 8/1994 |
| EP | 0 965 516 | 12/1999 |

OTHER PUBLICATIONS www.precisioncoat.com/hvof.htm.*

* cited by examiner

*Primary Examiner*—Lesley D. Morris
*Assistant Examiner*—Marlon Arce-Diaz
(74) *Attorney, Agent, or Firm*—Price, Heneveld, Cooper, DeWitt & Litton, LLP

(57) ABSTRACT

A trailer hitch assembly includes a hitch plate and a locking mechanism. The hitch plate includes a throat for receiving a kingpin of a trailer. The locking mechanism locks the kingpin in the throat and includes a pair of lock jaws whose lock jaw contact surface, which contacts the kingpin, is treated with an alloy obviating the need for a lubricant while maintaining the wear life of the pair of lock jaws.

20 Claims, 4 Drawing Sheets

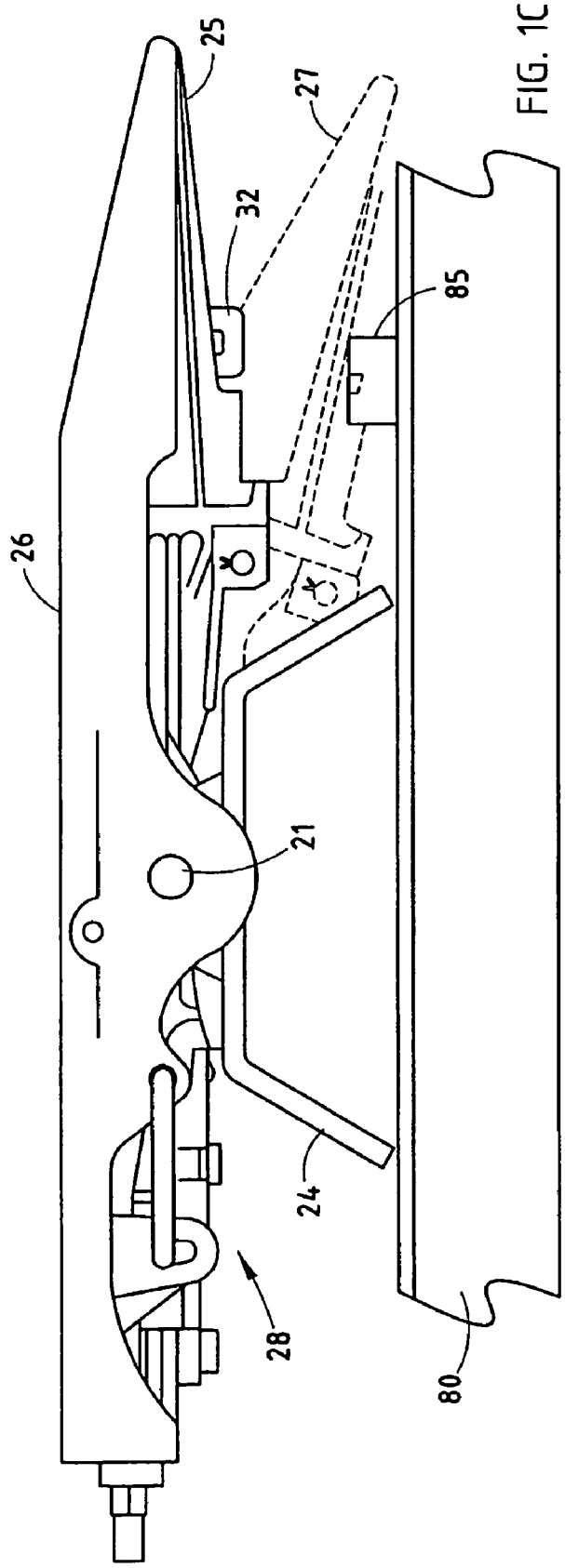
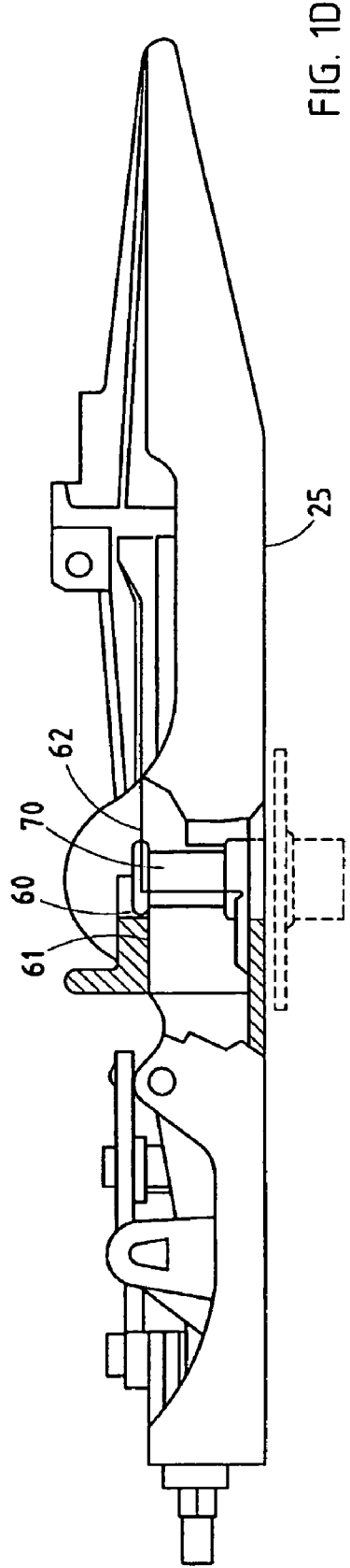

FIFTH WHEEL HITCH REQUIRING REDUCED OR NO LUBRICANT

This application is a national stage of International Application No. PCT/US03/03693, filed Feb. 7, 2003, which claims the benefit of U.S. Provisional Patent Application Ser. No. 60/335,908, filed Feb. 11, 2002, the disclosure of which is hereby incorporated by reference in its entirety.

BACKGROUND OF THE INVENTION

The present invention is generally directed to a fifth wheel hitch and, more specifically, to a fifth wheel hitch that requires reduced or no lubricant.

Fifth wheel hitches, which are utilized throughout the trucking industry, include a number of moving components, which have required lubricants (e.g., grease) to prevent excessive wear. In general, service technicians have liberally applied lubricants to various components of the fifth wheel hitch to prevent excessive wear. However, applying grease to the fifth wheel requires periodic service and over greasing the fifth wheel can potentially result in harm to the environment (e.g., fire hazard, contamination of storm and/or ground water) as any excess grease may be dispersed into the environment, during operation of an associated tractor trailer unit. In an attempt to reduce lubricant utilization, a number of manufacturers have implemented greaseless fifth wheel top plate pads, as well as grease free plastic and specialty metal front lock and bearing pocket inserts. A number of coupler manufacturers have also utilized protective layers that are painted or electroplated to fifth wheel components to inhibit corrosion. However, in general, these protective layers have not enhanced wear of the components or provided lubricity.

Further, in general, metal objects that are exposed to various environmental conditions suffer from oxidation, corrosion and rusting. Typically, surfaces of metal objects have been protected by painting, cladding, coating or electroplating the metal surfaces with a protective layer. However, these techniques have proven somewhat undesirable as such protective layers have frequently required partial removal and application of another protective layer to the surface of the metal object when the original protective layer has separated from the surface of the metal object. As a result, researchers have developed various other processes that alloys materials to surfaces of metal objects. For example, one process known as laser induced surface improvements (LISI) is directed to alloying a desired metal to a surface of a metal object with a laser. Apparatuses and techniques for implementing the LISI process are described in U.S. Pat. Nos. 5,961,861; 5,985,056; 6,016,227; and 6,229,118; which are all hereby incorporated herein by reference in their entirety.

What is needed is a fifth wheel hitch whose components exhibit enhanced wear and corrosion resistance, while minimizing the application of applied lubricants.

SUMMARY OF THE INVENTION

An embodiment of the present invention is directed to a trailer hitch assembly that includes a hitch plate and a locking mechanism. The hitch plate includes a throat for receiving a kingpin of a trailer. The locking mechanism locks the kingpin in the throat and includes a pair of lock jaws whose lock jaw contact surface, which contacts the kingpin, is treated with an alloy obviating the need for a lubricant while maintaining the wear life of the pair of lock jaws.

According to another embodiment of the present invention, a trailer hitch assembly is provided that includes a hitch plate and a locking mechanism. The hitch plate includes a throat for receiving a kingpin of a trailer and the locking mechanism locks the kingpin in the throat and includes a front lock insert coupled to the hitch plate whose insert contact surface, which contacts the kingpin, is treated with an alloy obviating the need for a lubricant while maintaining the wear life of the insert.

These and other features, advantages and objects of the present invention will be further understood and appreciated by those skilled in the art by reference to the following specification, claims and appended drawings.

BRIEF DESCRIPTION OF THE DRAWINGS

In the drawings:

FIG. 1C is a side view of the trailer hitch assembly of FIG. 1A;

FIG. 1D is a side view of a partial cross-section of the trailer hitch assembly shown in FIG. 1B;

DETAILED DESCRIPTION OF THE PREFERRED EMBODIMENTS

The present invention is directed to a trailer hitch assembly (fifth wheel hitch) that employs the selective application of advanced coatings and surface treatments to specific mechanical components of the trailer hitch assembly to provide enhanced wear, superior corrosion resistance and lubricity, while decreasing the need for applied lubricants (e.g., grease). In various embodiments of the present invention, lock jaws of the trailer hitch assembly and a front lock insert of the trailer hitch assembly are treated using a laser induced surface improvement (LISI) process. It should be appreciated that trailer hitch assemblies utilized in tractor trailers include a plurality of moving components, which have generally required liberal application of lubricants. According to one embodiment of the present invention, the need for lubricants is eliminated in the coupler mechanism through surface treatments of various components associated with the coupler mechanism (i.e., the front lock insert or a front lock area of the hitch plate and the lock jaws).

According to the present invention, the direction of the rasters (i.e., vertical or horizontal laser lines) and the spacing of the rasters are selected to provide optimum performance. In one application, a metalized slurry is produced and the metalized slurry is placed on a wear surface of the component to be treated. From that point, a laser is utilized to basically micro-weld (i.e., alloy) the slurry to the surface of the component. The slurry may include a variety of materials, such as titanium boride with molybdenum, chrome boride or chromium with boron. In general, it is desirable to raster the material onto the metal surface of the component in a direction that is parallel to the direction of greatest wear. In this manner, when two surfaces move in relationship to each other, they move parallel or with the rasters as opposed to running perpendicular to the rasters. It should also be appreciated that the dimensions of a component may need to be reduced (e.g., 0.004 of an inch may be removed) to accommodate for the alloy and maintain proper tolerances.

In general, it should be appreciated that wear treatment of all metal surfaces of components associated with tractor trailer unit mechanisms that move with respect to one another may be beneficial. For example, a horn on a pintle hook may be treated or other high wear surfaces, such as bushing contacts and/or a slider edge that runs between a suspension slide frame of a trailer, may benefit from a similar treatment as disclosed herein.

Figure 1A:
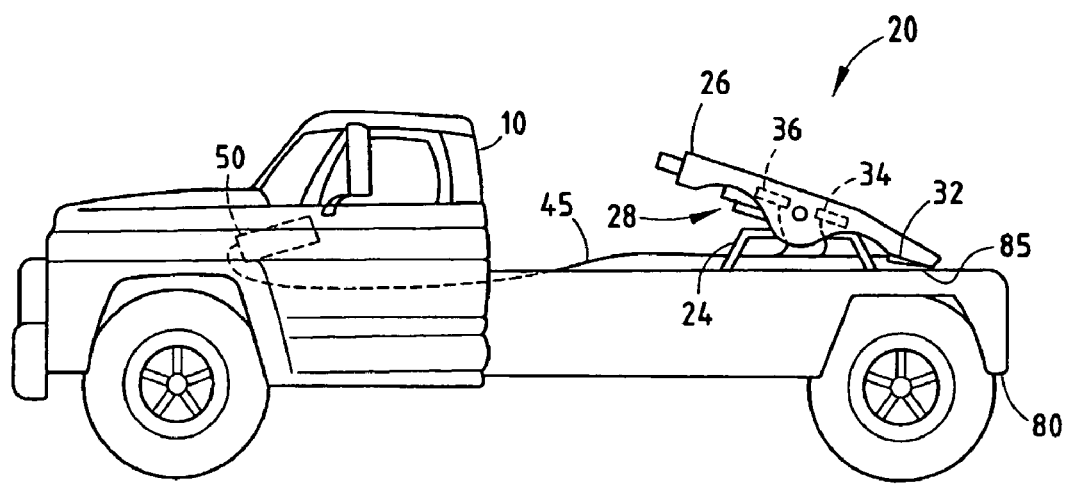
FIG. 1A is a side view of an exemplary truck tractor including a trailer hitch assembly.

FIG. 1A shows an exemplary truck tractor 10, which includes a trailer hitch assembly 20 having a base 24 securely mounted to a chassis 80, a trailer hitch plate 26 pivotally mounted on the base 24 on a transverse axis and a locking mechanism 28 for locking a conventional trailer kingpin in place. As shown, the truck tractor 10 includes an electronic system that includes three proximity sensors mounted to the hitch assembly 20 and an output device 50 mounted in the cab of the tractor 10. It should be understood that the electronic system is not a part of the present invention. The sensors, which may include a tilt sensor 32, a kingpin sensor 34 and a lock sensor 36, are coupled to the output device 50 by a multi-conductor cable 45 and are mounted at appropriate locations to the trailer hitch assembly 20.

Figure 1B:
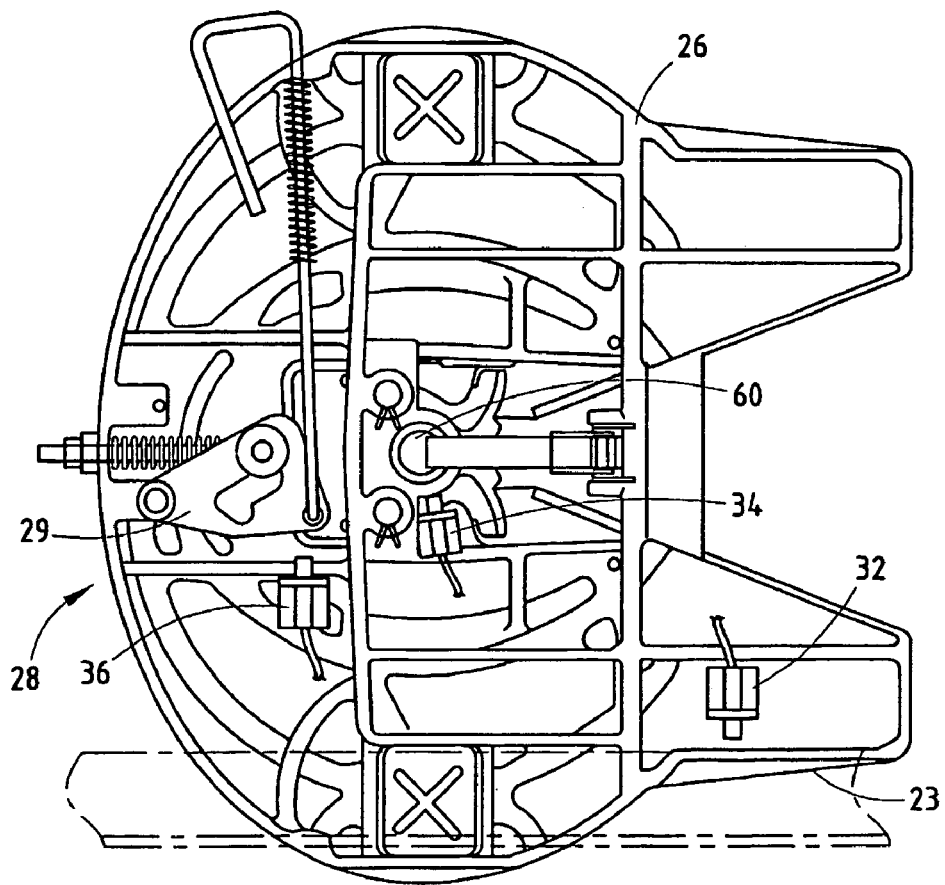
FIG. 1B is a bottom view of the trailer hitch assembly of FIG. 1A.

FIGS. 1B–1D provide more detailed views of the trailer hitch assembly 20 of FIG. 1A. The tilt sensor 32 may be mounted on a flange 23 of the hitch plate 26 such that a sensing end faces outward in a direction perpendicular to pivot pins 21. FIG. 1C shows the hitch plate 26 from the side in combination with the base 24 in a coupled horizontal position 25 and in an uncoupled at rest position 27 (dashed lines). By mounting a metal plate 85 on the chassis 80 in a position near where the sensing end of the tilt sensor 32 is positioned when the trailer hitch plate 26 is in the resting position, the tilt sensor 32 detects the presence of the plate 85 as a basis for determining that the hitch plate 26 is tilted or at a rest position. When the tractor 10 is backed under a trailer, contact is made between the tilted hitch plate 26 and a portion of the trailer. This contact causes the hitch plate 26 to rotate into a coupled (horizontal) position. When the tilt sensor 32 subsequently detects the absence of the plate 85, it can be concluded that the hitch plate 26 has been moved from its rest position and the trailer is in proximity to the hitch assembly 20. Alternatively, the sensor 32 may be mounted so as to detect metal when the hitch plate 26 is in the horizontal coupled position.

FIG. 1B shows the kingpin sensor 34 mounted to the hitch plate 26 with a sensing end near the throat 60 formed in the hitch plate 26, into which a trailer kingpin 70 is positioned and locked. FIG. 1D provides an upside-down side view of a partial cross-section illustrating the location of the trailer kingpin 70 when properly disposed in the throat 60. As constructed, the kingpin sensor 34 outputs a detection signal when the lower flange of the metal trailer kingpin 70 is disposed in the throat 60, below a lock plane 61. That is, the kingpin sensor 34 is in a plane below the locking mechanism 28 and only detects the kingpin 70 when a kingpin rib 62 of the kingpin 70 extends below the lock plane 61. The location of the kingpin sensor 34 prevents it from indicating that the kingpin 70 is present when a high coupling occurs, which prevents the locking mechanism 28 from securing the kingpin 70 (i.e., the trailer) to the hitch assembly 20. The locking mechanism 28, of the hitch assembly 20, is biased by a compression spring to automatically lock-in and secure the trailer kingpin 70, as soon as it enters the hitch throat 60.

FIG. 1B also depicts the lock sensor 36 mounted to the hitch plate 26 such that a sensing end is in a position proximate to a position of that of a metal cam plate 29 (of the locking mechanism 28) when in a locked position. In this manner, the lock sensor 36 detects the presence of the cam plate 29 as a basis for detecting if the locking mechanism 28 is in a locked and secured position. Those of ordinary skill in the art will appreciate that the present invention may be used in connection with any type of locking mechanism. It should also be noted that the present invention may be applied to trailer hitch assemblies having other constructions and is not limited to the particular mounting locations shown for the sensors 32, 34 and 36. Further, the various embodiments of the present invention are equally applicable to trailer hitch assemblies that do not include an electronic system, which is utilized to monitor the status of the assembly.

Figure 2:
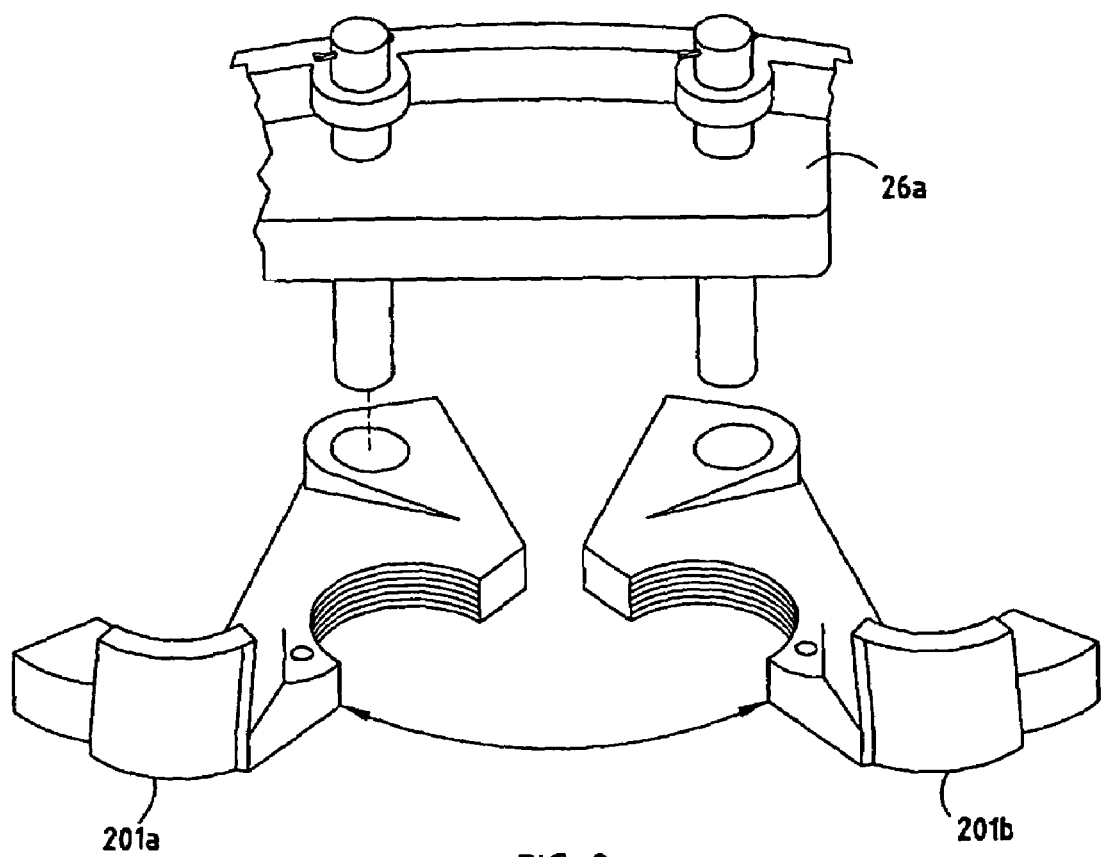
FIG. 2 is a perspective view of a portion of a hitch plate including lock jaws treated according to an embodiment of the present invention.

FIG. 2 depicts various components typically associated with the trailer hitch assembly 20 of FIG. 1A. More specifically, a partial view of a hitch plate 26a with an attached pair of lock jaws 201a and 201b, which have been alloyed using the LISI process, are depicted. As shown in FIG. 2, raster lines of the lock jaws 201a and 201b run in a horizontal direction. As previously mentioned, depending upon the application, it may be preferable for the direction of the raster lines to be directed parallel to the direction of greatest wear. It should be appreciated that other processes which alloy a wear resistant material (i.e., a metal) that provides lubricity may be utilized and that the LISI process is not the only process that can be utilized to alloy appropriate metals to steel components associated with a trailer hitch assembly. It may also be beneficial to treat other components (e.g., a yoke, a cam plate, lock pins, yoke shaft, etc.) that experience less wear with commercially available baked on coatings, such as a dry film lubricant containing molybdenum disulfide. Components, such as a cam roller, may be through-hardened and cam washers may be made of Nylatron™ or stainless steel.

Figure 3:
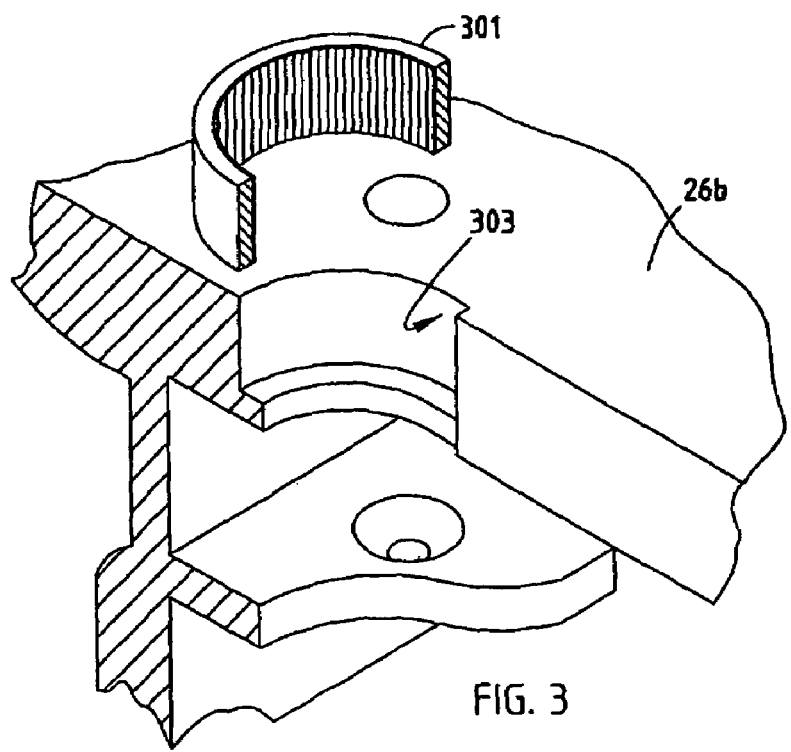
FIG. 3 is a perspective view of a portion of a hitch plate at a front lock area of a trailer hitch assembly including an insert treated according to another embodiment of the present invention.

FIG. 3 illustrates a portion of a hitch plate 26b at a front lock area 303 of a trailer hitch assembly, according to one embodiment of the present invention. As is shown in FIG. 3, a front lock insert 301 is shaped to be received in the hitch plate 26b in the front lock area 303. It should be appreciated that a hitch plate may be configured such that an insert is not utilized and, in this case, it is desirable to treat the hitch plate in the front lock area with an alloy that resists wear and provides lubricity.

Figure 4:
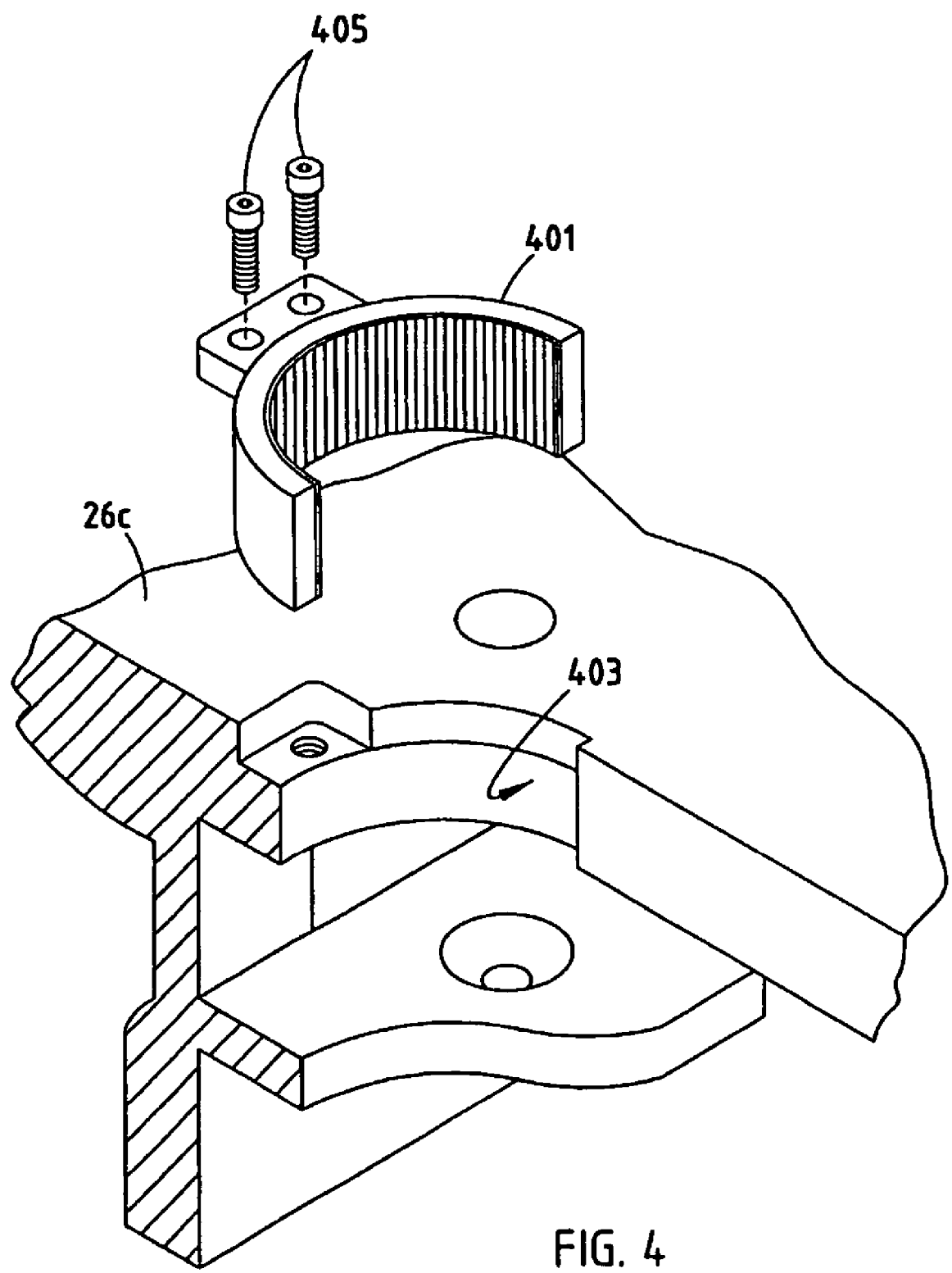
FIG. 4 is a view of a portion of a hitch plate at a front lock area of a trailer hitch assembly including another insert treated according to yet another embodiment of the present invention.

FIG. 4 is a view of a portion of a hitch plate 26c at a front lock area 403 of a trailer hitch assembly, according to another embodiment of the present invention. As is shown in FIG. 4, a front lock insert 401 is shaped to be received by the hitch plate 26c in the front lock area 403 and is fixed to the hitch plate 26c with a pair of fasteners (e.g., set screws) 405.

Accordingly, a trailer hitch assembly has been described herein that employs the selective application of advanced coatings and surface treatments to specific mechanical components of the fifth wheel hitch to provide enhanced wear, corrosion resistance and lubricity, which obviates the need for applied lubricants to components so treated.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A trailer hitch assembly, comprising:
   a hitch plate with a throat for receiving a kingpin of a trailer; and
   a locking mechanism for locking the kingpin in the throat, wherein the locking mechanism includes a pair of lock jaws comprising an alloy made of a first material and a second material, and wherein a lock jaw contact surface of the lock jaws that contacts the kingpin includes the second material alloyed to the first material obviating the need for a lubricant while maintaining the wear life of the pair of lock jaws.

2. The assembly of claim 1, wherein the locking mechanism includes a front lock insert made of a third material, and wherein the lock insert is coupled to the hitch plate and includes an insert contact surface that contacts the kingpin and that includes a fourth material alloyed to the third material obviating the need for a lubricant while maintaining the wear life of the insert.

3. The assembly of claim 2, wherein the second and fourth materials are one of a titanium boride with molybdenum, a chrome boride and chromium with boron.

4. The assembly of claim 2, wherein the second material is joined to the lock jaws at the lock jaw contact surface and the fourth material is joined to the insert at the insert contact surface through a laser induced surface improvement (LISI) process.

5. The assembly of claim 4, wherein the LISI process is performed on the lock jaw contact surface and the insert contact surface such that raster lines run parallel to the direction of greatest wear.

6. The assembly of claim 1, wherein a front lock area of the hitch plate throat contacts the kingpin when the kingpin is locked to the hitch plate by the locking mechanism, and wherein the front lock area of the hitch plate throat that contacts the kingpin obviating the need for a lubricant while maintaining the wear life of the front lock area of the hitch plate throat.

7. The assembly of claim 6, wherein the fifth material is one of a titanium boride with molybdenum, a chrome boride and chromium with boron.

8. A trailer hitch assembly, comprising:
   a hitch plate with a throat for receiving a kingpin of a trailer, wherein the hitch plate includes a front lock insert coupled to the hitch plate and comprising an alloy made of a first material and a second material and, wherein an insert contact surface of the lock insert that contacts the kingpin includes the second material alloyed to the first material obviating the need for a lubricant while maintaining the wear life of the insert; and
   a locking mechanism for locking the kingpin in the throat.

9. The assembly of claim 8, wherein the locking mechanism includes a pair of lock jaws made of a third material, and wherein a lock jaw contact surface of the lock jaws that contacts the kingpin includes a fourth material alloyed to the third material obviating the need for a lubricant while maintaining the wear life of the pair of lock jaws.

10. The assembly of claim 9, wherein the second and fourth materials are one of a titanium boride with molybdenum, a chrome boride and chromium with boron.

11. The assembly of claim 9, wherein the second material is joined to the lock jaws at the lock jaw contact surface and the fourth material is joined to the insert at the insert contact surface through a laser induced surface improvement (LISI) process.

12. The assembly of claim 11, wherein the LISI process is performed on the lock jaw contact surface and the insert contact surface such that raster lines run parallel to the direction of greatest wear.

13. The assembly of claim 12, wherein the second and fourth materials are one of a titanium boride with molybdenum, a chrome boride and chromium with boron.

14. A trailer hitch assembly, comprising:
   a hitch plate with a throat for receiving a kingpin of a trailer, wherein the hitch plate comprises an alloy comprising a base material and a second material, a front lock area of the hitch plate throat contacts the kingpin when the kingpin is locked to the hitch plate, and wherein the front lock area of the hitch plate throat that contacts the kingpin includes the second material that is alloyed to the base material obviating the need for a lubricant while maintaining the wear life of the front lock area of the hitch plate throat; and
   a locking mechanism for locking the kingpin in the throat.

15. The assembly of claim 14, wherein the locking mechanism includes a pair of lock jaws made of a first material, and wherein a lock jaw contact surface of the lock jaws that contacts the kingpin includes a fourth material alloyed to the first material obviating the need for a lubricant while maintaining the wear life of the pair of lock jaws.

16. The assembly of claim 15, wherein the second and fourth materials are one of a titanium boride with molybdenum, a chrome boride and chromium with boron.

17. The assembly of claim 15, wherein the second and fourth materials are joined to the lock jaw at the lock jaw contact surface and to the hitch plate in the front lock area through a laser induced surface improvement (LISI) process.

18. The assembly of claim 17, wherein the LISI process is performed on the lock jaw contact surface and the hitch plate in the front lock area such that raster lines run parallel to the direction of greatest wear.

19. The assembly of claim 18, wherein the second and fourth materials are one of a titanium boride with molybdenum and a chrome boride.

20. The assembly of claim 18, wherein the second and fourth materials are a chrome boride.

* * * * *